(12) United States Patent
Dolhay

(10) Patent No.: US 6,431,924 B1
(45) Date of Patent: Aug. 13, 2002

(54) AMPHIBIOUS CARAVAN

(76) Inventor: Balázs Dolhay, Domoszlóút 18, H-1037 Budapest (HU)

( * ) Notice: Subject to any disclaimer, the term of this patent is extended or adjusted under 35 U.S.C. 154(b) by 0 days.

(21) Appl. No.: 09/601,082

(22) PCT Filed: Jan. 25, 1999

(86) PCT No.: PCT/HU99/00006
§ 371 (c)(1),
(2), (4) Date: Jul. 25, 2000

(87) PCT Pub. No.: WO99/37493
PCT Pub. Date: Jul. 29, 1999

(30) Foreign Application Priority Data

Jan. 26, 1998 (HU) .............................................. 9800140

(51) Int. Cl.⁷ ........................................... B63H 21/175
(52) U.S. Cl. ....................................................... 440/11
(58) Field of Search ..................... 440/11, 12; 114/344

(56) References Cited

U.S. PATENT DOCUMENTS 2,997,012 A * 8/1961 Ozkok .......................... 440/11
3,332,388 A * 7/1967 Moraski ....................... 440/11
3,335,437 A * 8/1967 Judkins ....................... 114/344
3,629,884 A * 12/1971 Brown ......................... 114/344
3,731,644 A * 5/1973 Bradt .......................... 114/344

FOREIGN PATENT DOCUMENTS

FR     2 306 870 A * 11/1976 .................. 440/11

* cited by examiner

Primary Examiner—Sherman Basinger
(74) Attorney, Agent, or Firm—Jenkens & Gilchrist, P.C.

(57) ABSTRACT

The invention relates to an amphibious caravan comprising a floating chassis with wheels and at least one cabin with a living compartment. The caravan has a vehicle deck receiving a towing vehicle. The vehicle deck is situated adjacent to the cabin. The caravan is equipped with a marine screw suitable for moving the caravan on the water. According to the invention, the cabin may be displaced substantially parallel to the longitudinal axis of the chassis, so that the length of the deck receiving the vehicle is variable.

13 Claims, 7 Drawing Sheets

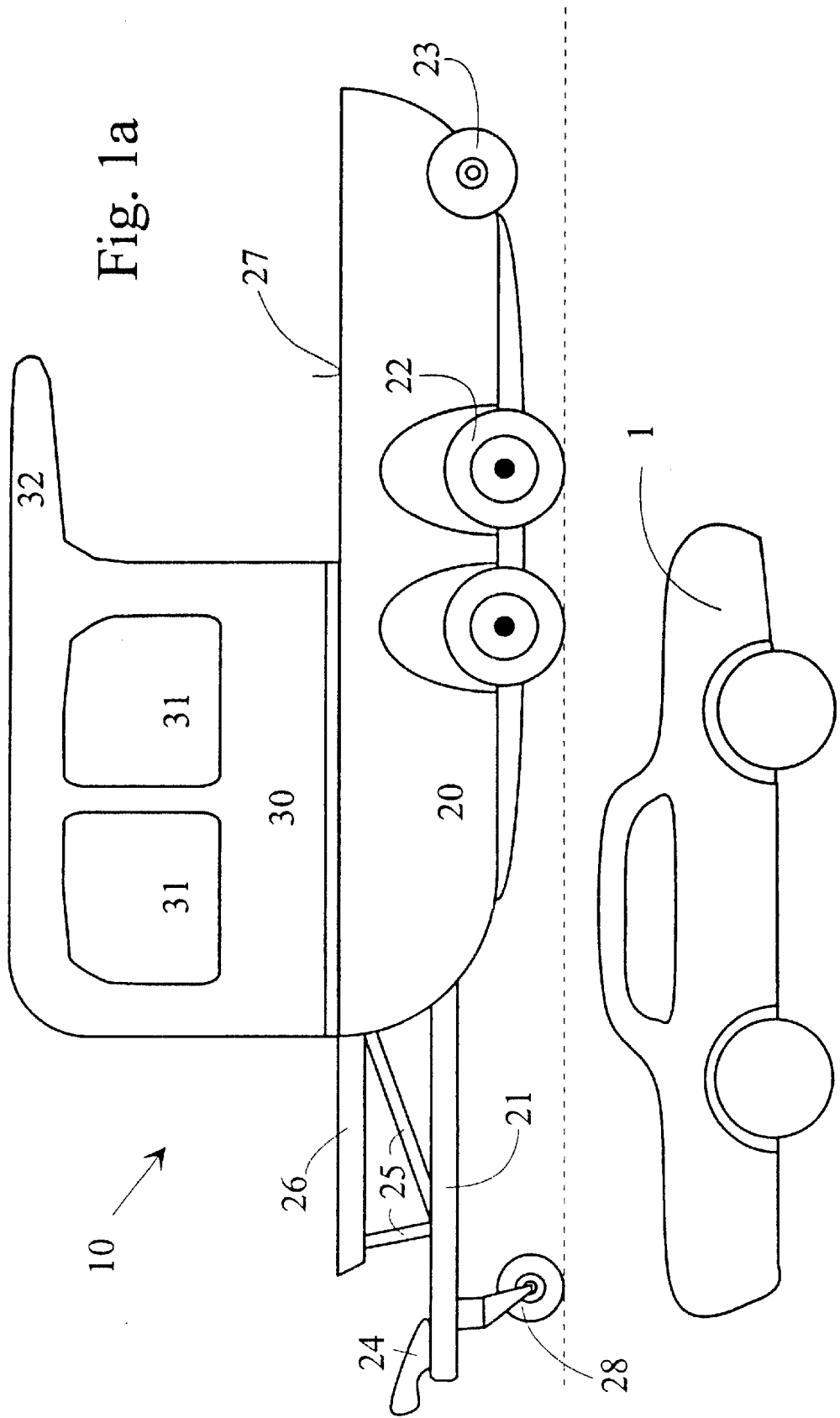

AMPHIBIOUS CARAVAN

TECHNICAL FIELD

The object of the invention is an amphibious caravan. The caravan of the invention comprises a floating chassis with wheels and at least one cabin with a living compartment. The caravan also comprises a vehicle deck receiving a towing vehicle. The chassis comprises propulsion means suitable for movement on water.

BACKGROUND ART

Several solutions are known from the patent literature, relating to amphibious caravans of the type described above. Among others, FR 2 645 498 A1 discloses an amphibious caravan which may be supplemented by floating pontoons. These pontoons are designed to bear the towing vehicle. The towing vehicle serves at the same time as the driving power source of the complete floating unit. The power of the towing vehicle is transmitted to the driving paddle wheels by a conveyor mechanism. A disadvantage of this known solution is that the water-tight body of the floating chassis is separate from the pontoons bearing the vehicle. Thereby the power of the engine of the vehicle may not be transmitted to the back part of the chassis, or may be transmitted only via very complicated mechanisms, where the driving means could be realised effectively, e.g. by means of a marine screw. Therefore, the very ineffective paddle wheel must be used.

Large number of known solutions are devoted to self-propelling amphibious caravans, i.e. caravans without a towing vehicle. Such solutions are disclosed in the documents EP 0 085 384 A2, DE-OS 2 238 786 and DE 30 49 833 A1. These known solutions seek to enlarge a relatively small rolling caravan, which take up relatively little space on dry land, and try to enlarge the caravan on the water by folding it out and thereby achieving more space. In this respect it must be noted that an independent engine built into a caravan is rather costly. The known self-propelling caravans (motor home, wohnmobile) tend to cost twice as much as a traditional caravan (wohnwagen) with a similar size and equipment. This extra cost is recovered very slowly, or never, because a caravan is normally not used so much so that the relatively small savings attained by omitting a towing car should justify the extra cost for the permanent motor and the related necessary parts in the caravan.

If the amphibious caravan has no independent propelling means, the towing vehicle is necessary under any circumstances. However, the known caravans with the "folding" extension do not allow the water transport of the towing vehicle, and at the same time these foldable caravans find only a very limited use on land. Therefore, the caravan either must return to the towing vehicle, or another towing vehicle must be found if the caravan does not return to its original starting point. In any case, the freedom of movement of the user is limited. Beside, these known amphibious caravans are relatively bulky, large, and also heavy. Often, these Caravans are so large that only very powerful towing vehicles can be used for their transport on land.

Generally, it is a common disadvantage of the known solutions that the floating chassis of the caravans is not small enough for average drivers with an average car to tow them. If the caravan with a floating chassis is so small so that it may be towed conveniently, there is not room enough on the deck for the towing vehicle.

The document DE-OS 1 926 726 teaches a floating vehicle with a floating chassis and a deck designed for receiving the towing vehicle. The floating chassis is propelled by the vehicle on the deck by means of an appropriate transmission mechanism. The floating chassis is also provided with caterpillars for land movement, and these are also driven by the towing vehicle on the deck, i.e. the floating chassis has no engine on its own The description refers to a covered space on the deck suitable for living, but provides no details concerning the structure of this living space. Hence, this disclosure do not teach an amphibious caravan which would provide a convenient living space, but at the same time being small enough to be easily transportable on land, and at the same time being large enough to be able to transport its own towing vehicle on the water.

Therefore, it is an object of the present invention to provide an amphibious caravan with a simple mechanical construction, which, on one hand, is capable of transporting its own towing vehicle on the water, and on the other hand comprises a sufficiently large and convenient living compartment, and thirdly, its rolling chassis is sufficiently small so that it may be towed conveniently on road by an average, middle-category car. It is a further object to provide a towable amphibious caravan which is well balanced in case of different types of towing vehicles (front or rear wheel drive, front or rear engine), and allows the towing vehicle always to look towards the bow of the floating chassis. It is a further object to provide an amphibious caravan that is appropriately stable in water and on land, has good road characteristics during towing, and is simple in construction, avoiding the need for special materials or technical solutions. Especially, it is sought to provide the rolling and floating chassis of the caravan in a solid, unitary structure. This allows a strong construction, and the watertight sealing of the floating chassis, —which basically functions as a hull in the water—is also much easier to realise.

Further, it was sought to create a caravan that is easy to handle in general.

SUMMARY OF THE INVENTION

According to the invention, the above goals are achieved with an amphibious caravan comprising a floating chassis with wheels and at least one cabin with a living compartment, and further a vehicle deck receiving a towing vehicle, the vehicle deck situated adjacent to the cabin, and further comprising propulsion means suitable for movement on water, in particular marine screw. According to the invention, at least one cabin is movable along the longitudinal axis of the chassis, so that the length of the deck receiving the vehicle is variable. With this solution it is ensured that the caravan constitutes a relatively short, compact unit on land, but it "stretches out" on water, and allows deck space for the towing vehicle. Because the cabin comprising the living compartment constitutes a unit with a weight commensurable to the weight of the towing vehicle, and being movable relative to the chassis, at the same time an optimal balance of the chassis may be achieved. This optimal balance is reached by slightly varying the displacement of the cabin, and as a result, the complete floating unit will float in a horizontal position even with cars of different size and weight. If the cabin would be in a fixed position on the aft of the chassis—as with the known solutions—, the balance would have to be established with other known methods, like ballast water or similar. This would require additional complicated and expensive mechanical apparatus in the chassis. Contrarily, the caravan according to the invention needs no complicated structural elements, in particular there is no need for assembling the floating chassis from several separate parts, and thereby the sealing problems are eliminated. The floating chassis may be manufactured as a single unit, which may be made appropriately stiff and strong with known manufacturing methods. Also, the unit containing the living compartment need not be taken apart either, so the living quarters of the user need not be disturbed during launching or landing. Thereby the original purpose of the caravan, namely the rest and recreation of the users, may continue undisturbed. It must be stressed that the longitudinal translation of the cabin not only serves to increase the deck space, but also serves as a counterweight to establish the optimal balance of the whole floating unit on the water. This is especially advantageous in case of modem front-wheel driven cars, where the engine is normally in the front. As a result, the mass center of the car is also nearer the front, which negatively influences the balance of the chassis when the towing car is placed on the deck. The cars must be positioned before the cabin, and with the front towards the bow, if the amphibious caravan is driven from the car. This negative effect may be compensated well, practically perfectly, by pushing the cabin back. Therewith all types of cars may be placed before the cabin, with the front looking forward, and the amphibious caravan may be driven conveniently and safely from the seat of the car. With a preferred embodiment, the caravan of the invention is equipped with a drive mechanism co-operating with the undercarriage of the towing vehicle for utilising the power of the engine of the towing vehicle. With this solution an independent engine in the caravan is spared, saving cost and weight. Advantageously, the drive mechanism may be translated along the longitudinal axis of the chassis, and thereby being adjustable to the size and drive type of the driving vehicle. In this manner the towing vehicle may be placed optimally regarding the balance and mass center of the floating unit, and the front-wheel or rear-wheel drive of the towing vehicle may be considered as well. Therefore, the towing vehicle can always be placed on the floating chassis in a forward-looking position. This facilitates the operation of the engine, change of speed, etc. and the use of other navigation and comfort equipment which is installed in the towing vehicle. The complete floating unit may be driven from the driver's seat of the car, even the steering of the floating unit may be done with the steering wheel of the car.

However, it is also possible to include a separate engine in the chassis. In this case a relatively low-power electric motor may be considered, powered by accumulators and/or solar cells. Gasoline, petrol or gas-fuelled combustion motors are also applicable. These engines may help to reach port even if the vehicle on the deck is unusable, or the towing vehicle is not onboard. E.g. a smaller electric motor is easily installed in the chassis, and the more complicated and less efficient mechanical transmission between the car and the propulsion means may be spared.

With an especially advantageous embodiment, the chassis comprises a towing mechanism extending from the chassis, and the cabin is movable along a rail system bearing on the towing mechanism. The rail system provides a stable support for the cabin in the displaced position, and facilitates the easy displacement and relocation of the cabin itself. Preferably, the cabin is guided along the rail system with self-adjusting roller pairs. This solution ensures a backlash-free and stress-free stable connection between the cabin and the guiding rail system. The fastening force is proportional to the weight of the cabin itself. With an especially advantageous embodiment, the displaced cabin is supported flexibly and adjustably on the towing triangle, e.g. by the up-turned backing wheel. The tipping of the cabin is prevented by chains attached to the bottom of the cabin and to the towing triangle.

With a further improved embodiment, the deck comprises sideways extendible raves. This provides a convenient walking deck on both sides of the vehicle, and raises the side walls of the floating chassis, thereby improving its safety. The very same removable raves may be used for the boarding of the towing vehicle, or facilitates the landing or launching of the amphibious caravan on swampy, moorish ground or beach.

Although the cabin may be moved by human force, it may be advantageous to provide a hydraulic or spring-action cylinder-piston pair on the chassis for facilitating the movement of the cabin. Alternatively, the cabin may be moved by an electric supplementary motor. Optionally, the wheels of the chassis may be at least partly retractable into the chassis. The hydrodynamic parameters may substantially improve in this manner. Alternatively, the wheels of the chassis may be dismounted in water.

A further preferred embodiment of the caravan comprises a retractable and extendible support wheel to facilitate landing and/or launching. A further possibility is the provision of a stabilising support leg for stabilising the caravan on land, preferably on the deck side of the chassis. The support wheel may serve as the reserve wheel of the car or the floating chassis. The role of the support wheel is to bear the weight of the towing vehicle during rolling (or towing) onto the deck of the amphibious caravan, and to take up a part of the weight on soft, swampy grounds, and to facilitate the landing and launching of the complete floating unit. These support wheels also serve to protect the chassis against bumps and collisions from the front or the side.

It is also preferred to place the marine screw and the rudder within the floating body, in a protected and surrounded water channel. Thereby it is easier to protect these sensitive parts during towing, landing or launching, or during the movement in water.

BRIEF DESCRIPTION OF DRAWINGS

By way of example only, an embodiment of the invention will now be described with reference to the accompanying drawing, in which FIGS. 1a–b is a schematic side view of the amphibious caravan of the invention, together with the towing land vehicle, on land and on water.

BEST MODE FOR CARRYING OUT THE INVENTION

Figure 1B:
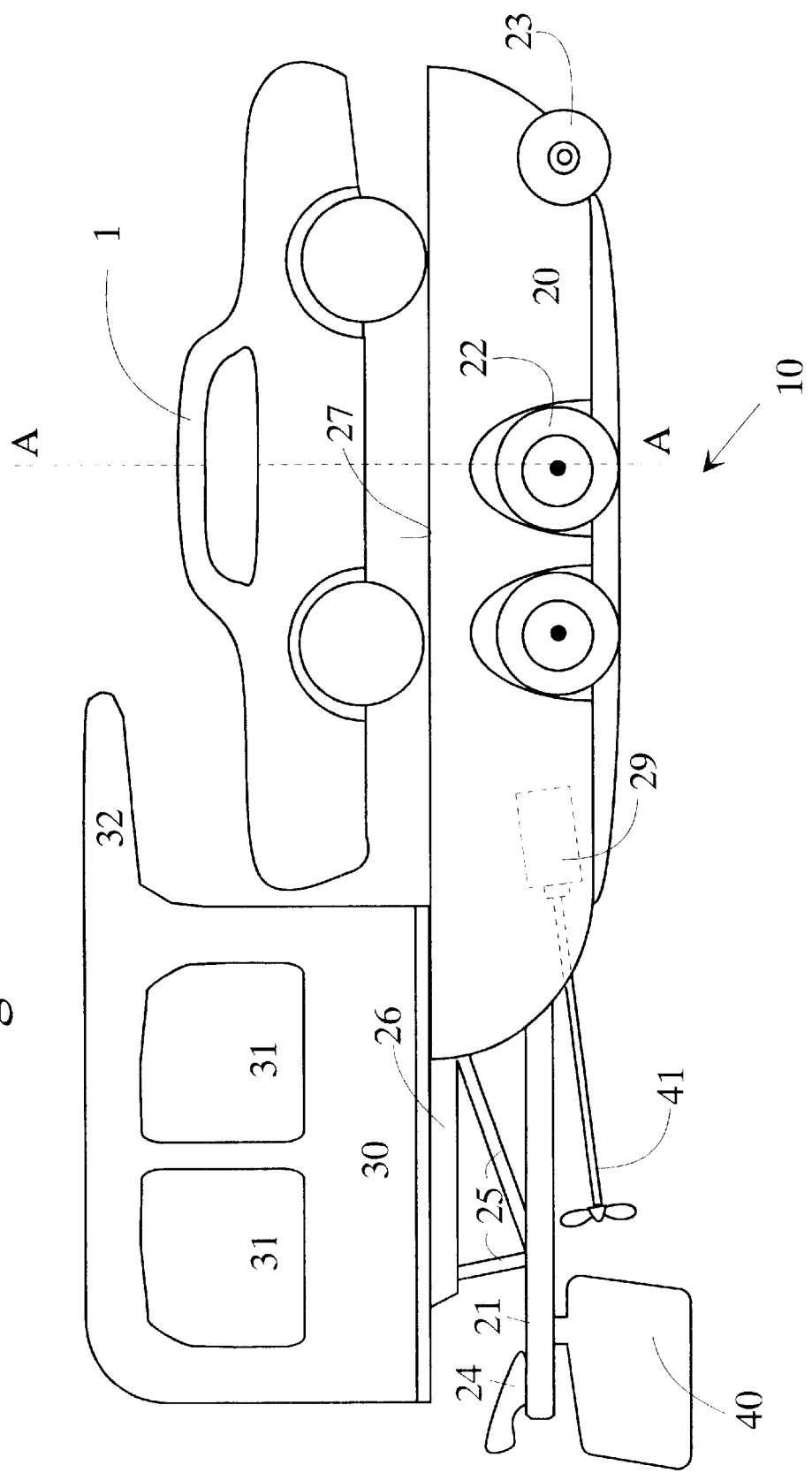

FIG. 1a shows the amphibious caravan 10, which can be towed by the vehicle 1, the latter being a middle-category passenger car. The 10 caravan is an amphibious caravan, which is achieved technically by placing a cabin 30 on a floating chassis 20. The cabin 30 serves as the living compartment. Beside the cabin 30, the chassis 20 also comprises a substantially plane deck 27. The deck 27 partly supplements the useful living area of the cabin 30, e.g. by serving as a sun deck, either on the water or on land. However, the main purpose of the deck 27 is to accommodate the towing vehicle 1 when the caravan 10 is on the water. According to a preferred embodiment, the vehicle 1 also serves as the power source of the caravan 10. Therefore, the power of the engine of the vehicle 1 is transmitted to the caravan 10 by means of a drive system or transmission mechanism 80, shown more in detail in FIGS. 6*a*–*c*. For this purpose, the transmission 80 is positioned close under the deck 27 on the chassis 20.

The cabin 30 is provided with windows 31 and a canopy 32, and a door (not shown) opening towards the deck 27. Beside, the cabin 30 is equipped with the usual equipment found in caravans, like furniture for sleeping, kitchen appliances, cooking gear, shower, toilet, etc.

At the front part of the chassis 20 there is a towing mechanism 21, suitable for attaching the caravan 10 to the towing vehicle 1. It must be noted that with the shown embodiment the "front part" of the caravan 10 is different for land and water use, as will be shown later. Accordingly, the towing mechanism 21 is on the front part of the caravan 10 when the latter is towed on land, but it is actually at the stern of the floating chassis 20, when the floating unit consisting of the chassis 20 and the cabin 30 is on the water. In a known manner, the towing mechanism 21 has a triangular shape when seen from above. Therefore, it is also referred to as the "towing triangle".

With the embodiment shown, the 20 chassis is carried by two pair wheels 22 on two axles, altogether four wheels 22. Optionally, the wheels 22 may be raised and lowered by a mechanism known in itself, so that the wheels 22 are retracted into the body of the chassis 20 and thereby have lower drag in the water. In order to avoid the oil pollution in natural waters, it is also possible to cover the wheel-boxes completely with a cover element (not shown), either by dismounting the wheels 22 or by retracting them completely. Obviously, the chassis 20 may have more or fewer axles than two. Preferably, the 20 chassis is also provided with a further pair of support wheels 23. These support wheels 23 find use primarily during landing or launching of the chassis 20. Optionally, the support wheels 23 may also be adjustable, and be raised or lowered with a known mechanism, or may be extended sideward or forward.

Extending above the towing mechanism 21 there is a rail system 26 attached to the chassis 20. The cabin 30 may be translated to some extent on the rail system 26 along the longitudinal axis of the chassis 20, substantially parallel to the longitudinal axis of the chassis 20. The deck 27 will increase considerably as the cabin 30 is pushed away. In a practical example, the chassis 20 of the caravan 10 may be e.g. 6 m long and 2,5–3 m wide, with a 3 m long cabin 30. Accordingly, if the cabin 30 is pushed in (i.e. pushed onto the deck 27), the free length of the deck 27 is also 3 meter. There is an approx. 2 m long towing mechanism 21 attached to the chassis 20, with the rail system 26 extending approx. 1,5 m above the towing mechanism 21. At the end of the towing mechanism 21 there is a coupler 24 for coupling the 21 towing mechanism to the tow-hook of the vehicle 1. The cabin 30 can be pushed out on the rail system 26 by approx. 2 meters, so the cabin 30 extends beyond the rail system 26 with only 0,5 meters, so the cabin 30 is supported in a substantially stable position. As a result of the pushing out by 2 meters, the length of the deck 27 will be approx. 5 meters, and provides sufficient space for the towing vehicle 1. Obviously, other dimensions and proportions may be applied as well.

For the sake of proper stability, the rail system 26 is propped up on the towing mechanism 21 by the stiffeners 25. On dry land, the towing mechanism 21 is also supported by the adjustable backing-wheel 28. The movable cabin 30 and the extendible 27 deck are useful not only on the water, but also on land, if the caravan 10 is parked in a wet, muddy area. In this case the raised and dry deck 27 is suitable for the convenient placement of chairs and table.

FIG. 1*b* shows the caravan 10 in its state on water. Comparing FIG. 1*b* and FIG. 1*a*, it is apparent that the cabin 30 is pushed back to a large extent (actually pushed forward relative to the towed state). The backing-wheel 28 is substituted with the rudder 40, and the marine screw 41 has been extended from the chassis 20. The wheels 22 are almost completely retracted into the chassis 20, and they protrude only in an extent to assist the landing and the launching of the caravan 10 on a shallow beach.

As it is apparent from FIGS. 1*a* and 1*b*, the pushing out of the cabin 30 has significantly increased the deck 27, creating ample space for the towing vehicle 1. It is appreciated that other propulsion means for the movement on water may be applied instead of the marine screw 41. The chassis 20 may be propelled on water by a paddle-wheel or a water jet. The rudder 40 is operable from the cabin 30, or, advantageously, from a controlling device (not shown), which may be attached on the dashboard or the steering wheel of the vehicle 1, and which controls the rudder 40 electrically or electronically, by means of servo motors. This solution is most convenient because the engine of the vehicle 1 is operated most easily from the driver's seat of the vehicle 1. Expediently, the caravan 10 is also controlled from here on water, and therefore it is practical to operate the rudder 40 from the driver's seat.

However, it is also possible to include a separate engine in the chassis. E.g. a smaller electric motor 29 may be easily installed in the chassis, as indicated in FIG. 1*b* with dotted lines.

Figure 2A:
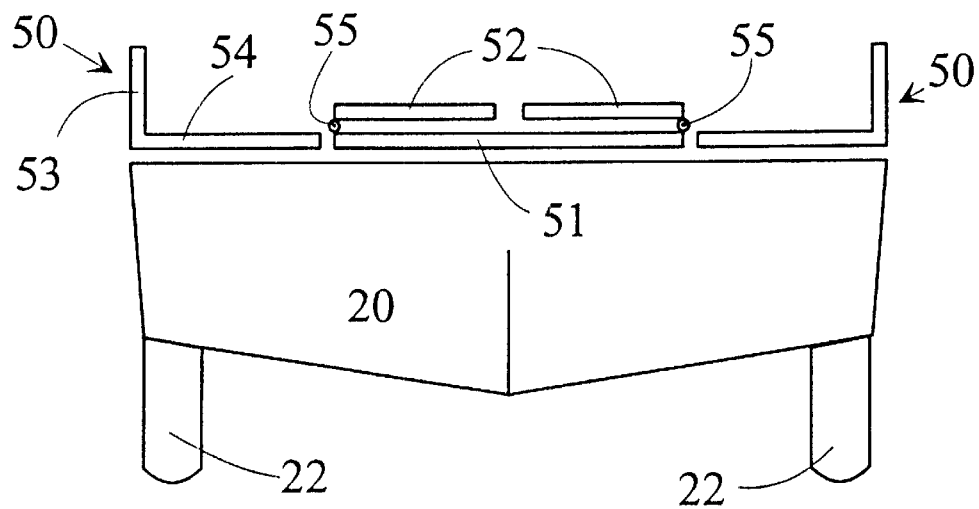
FIGS. 2a–b is a further detail of the amphibious caravan according to FIG. 1a–b, shown in cross section along line A—A in FIG. 1a, FIGS. 3a–b is another modified detail of the amphibious caravan of the invention, specifically the positioning of the cylinder-piston pair for facilitating the movement of the cabin, shown in the forward and backward position of the cabin.
Figure 2B:
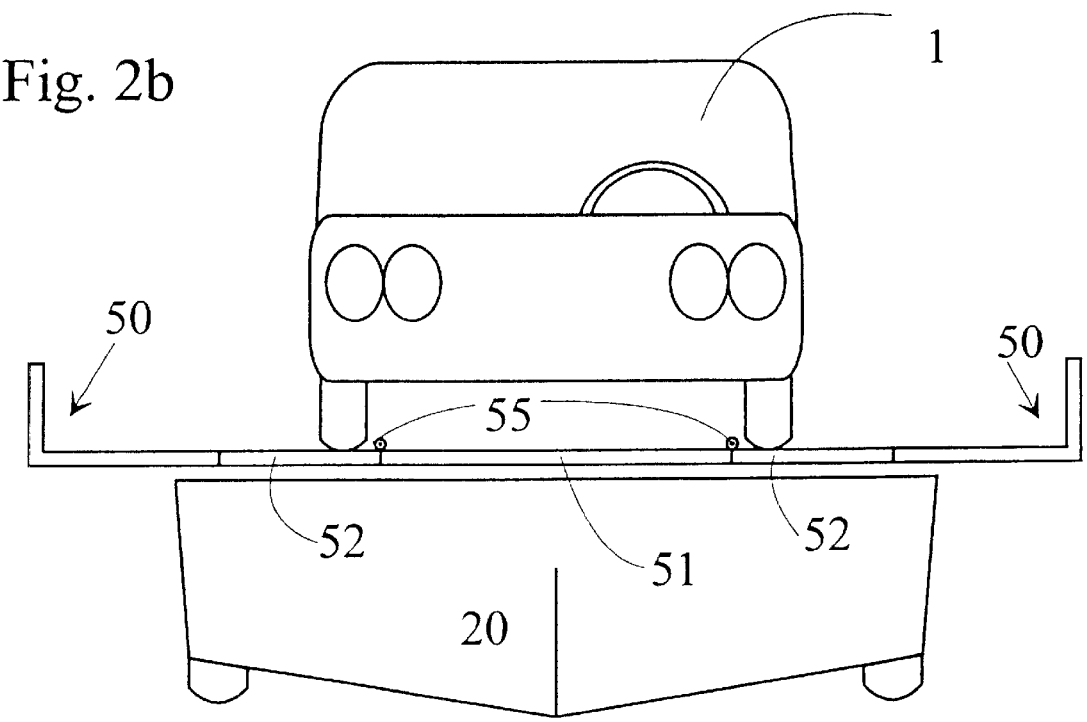

FIGS. 2*a* and 2*b* show an improved detail of the caravan according to the invention.

FIGS. 2*a* and 2*b* correspond to a partial cross-section, taken along the line A—A in FIG. 1*b*. In order to gain additional space on the deck 27, the chassis 20 is provided with raves 50, which are extendible to the sides, and thereby increase the width of the deck 27. Considering the restraints imposed by the road transport, namely that the caravan 10 and the chassis 20 may not be much more wide than the towing vehicle 1, this means practically that the latter completely occupies the deck 27. As a result, the doors of the vehicle 1 can not be opened, and there is no space on the deck 27 to conveniently walk along the vehicle 1.

To improve the situation, according to the invention it is suggested to apply raves 50 with a substantially L-shaped cross-section, which can be pushed to the side and thereby increase the width of the deck 27. The vertical walls 53 of the raves 50 increase the height of the sides of the chassis 20. The horizontal plates 54 of the raves 50 are in the same plane as the floor 51. After the raves 50 have been extended, the gaps after the horizontal plates 54 are covered by the cover-plates 52, which are attached by hinges 55 to the floor 51. Preferably, the raves 50 (or optionally the cover plates 52) are detachable, and may be used as the boarding ramp for the vehicle 1.

Figure 3A:
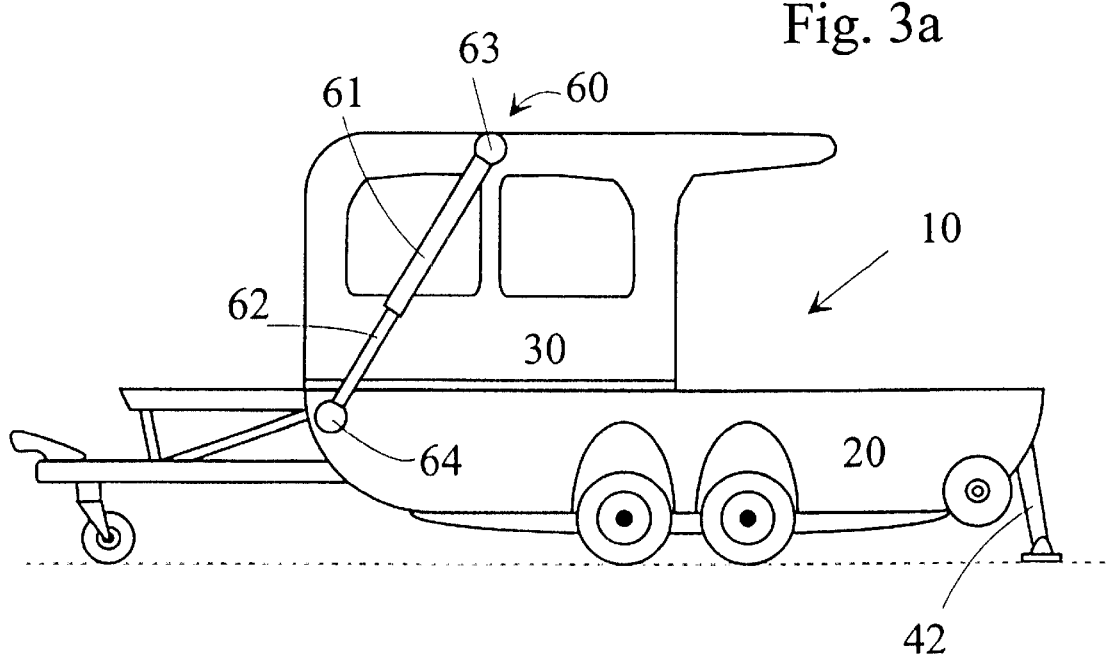
Figure 3B:
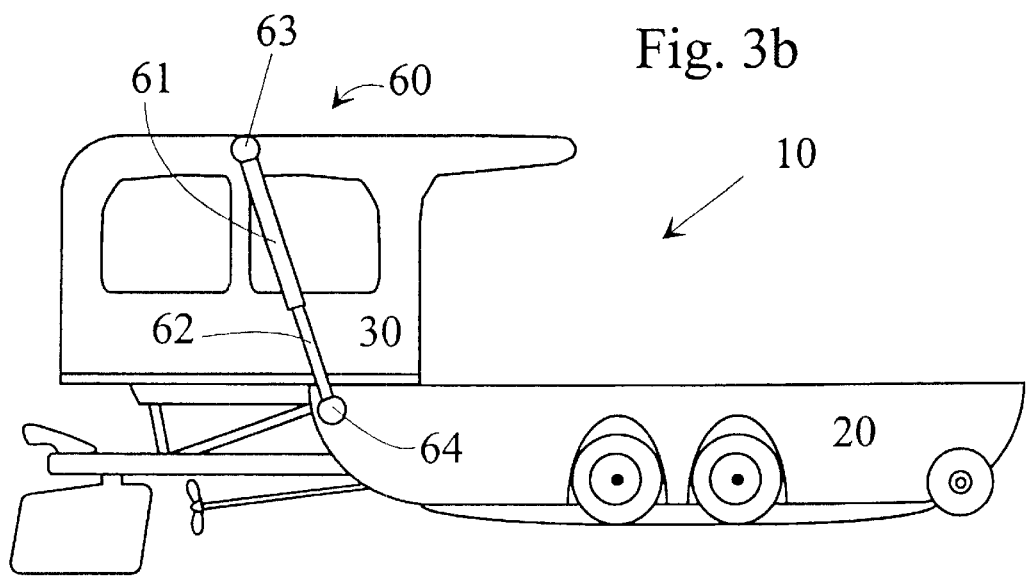

FIGS. 3a and 3b illustrate a possible embodiment of the pushing mechanism 60 to assist the displacement of the cabin 30. The pushing mechanism 60 comprises the 61 cylinder and the cooperating piston 62, which are attached to the cabin 30 and the chassis 20 in a first joint 63 and a second joint 64, respectively. The joints are practically pivot pins. The 61 cylinder comprises a spring (not shown), which urges to push out the piston 62, and thereby keeps the cabin 30 in one of the end positions.

When the cabin 30 is pushed towards its other end position, the spring is first pushed together, and after passing a dead point somewhere between the two end positions of the cabin, the spring will expand again, and will now assist in pushing the cabin 30 towards its other end position. With the proper adjustment of the spring force, initially a small force is enough to push the spring together, and the stronger spring forces around the dead point are more easily encountered by the inertia of the moving cabin. With a further advantageous embodiment, the length and the force of the spring is chosen so that it is slightly extended in the end positions of the cabin 30, and initially contributes to the displacement of the cabin 30. The spring is pushed together only later, in a partly displaced position of the cabin 30.

However, other solutions for moving the cabin 30 are also obvious to the skilled person. E.g. the displacement of the cabin 30 along the rail system 26 may be effected with a hydraulic cylinder-piston pair, or with an electric motor, via a known rotary-linear transmission, like a screw or sprocket-chain system.

FIG. 3a also shows a support-leg 42, which may be raised and lowered, or folded up, and which serves to stabilise the caravan 10 on land, similarly to the backing wheel 28, e.g. during a longer stay, camping, or when the vehicle 1 is boarding the deck 27, or whenever necessary.

Figure 4:
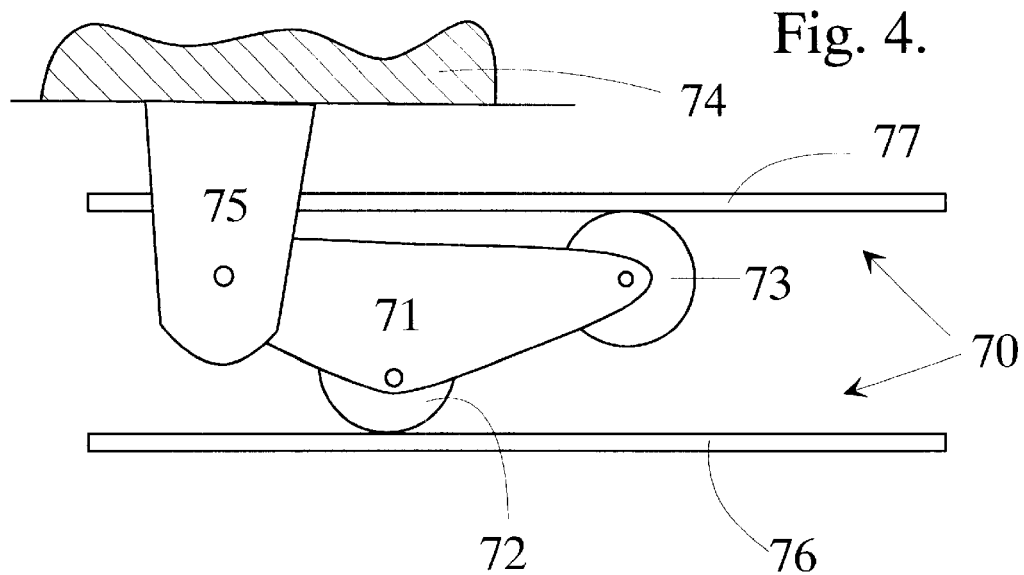
FIG. 4 shows the structure of the self-adjusting roller pairs to support the cabin.
Figure 5:
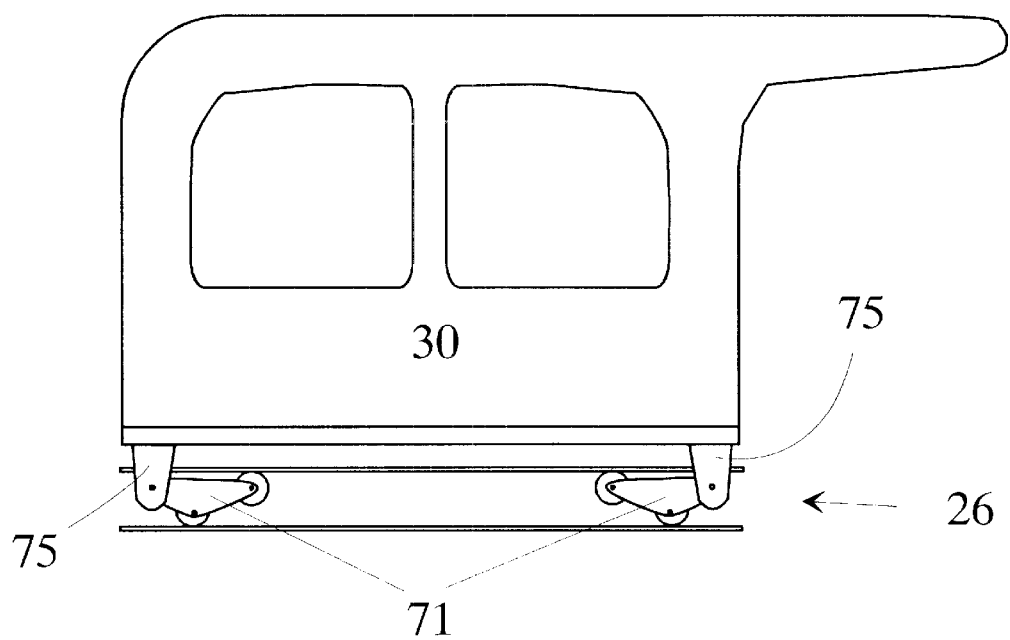
FIG. 5 illustrates the use of the roller pairs according to FIG. 4, being mounted under the cabin.

FIGS. 4 and 5 illustrate possible means of fastening and guiding the cabin 30 along the rail system 26. In this case brackets 75 are fastened to the bottom 74 of the cabin 30, and a support arm 71 is attached rotatably to the bracket 75. The support arm 71 comprise rollers 72 and 73, which are pressed against the lower rail 76 and the upper rail 77, respectively, of the rail 70 in the rail system 26. In this manner the rollers 72 and 73 constitute a self-adjusting roller pair. As it is apparent from FIG. 4, the support arm 71 acts as a two-armed lever, with the roller 72 as the fulcrum, while the two arms are pressed by the bracket 75 and the roller 73. FIG. 5 shows that there is a bracket 75 on the front and rear end of the cabin 30 on both sides, so altogether four self-adjusting roller pairs stabilise the cabin 30 on the rail system 26. It will be appreciated that other guiding means are equally well applicable. Not only rolling, but guiding means with a gliding operation, made of suitable materials may be applied as well. Preferably, the cabin 30 is fixed in the two end positions with a suitable device (not shown), in order to avoid any undesirable displacement of the cabin 30 either on land or water.

Figure 6B:
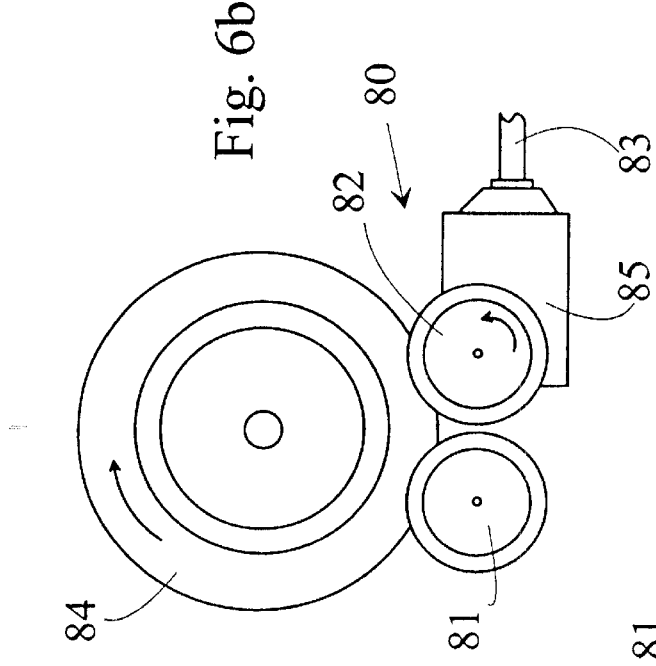
FIGS. 6b–c are side and front views of a detail of the driving transmission of FIG. 6a, and finally
Figure 6C:
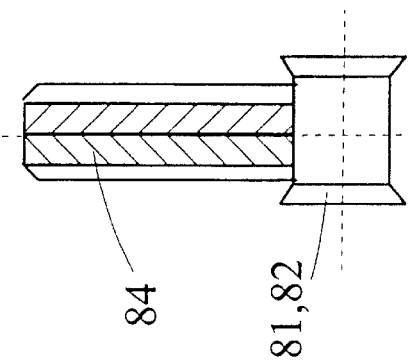
Figure 6A:
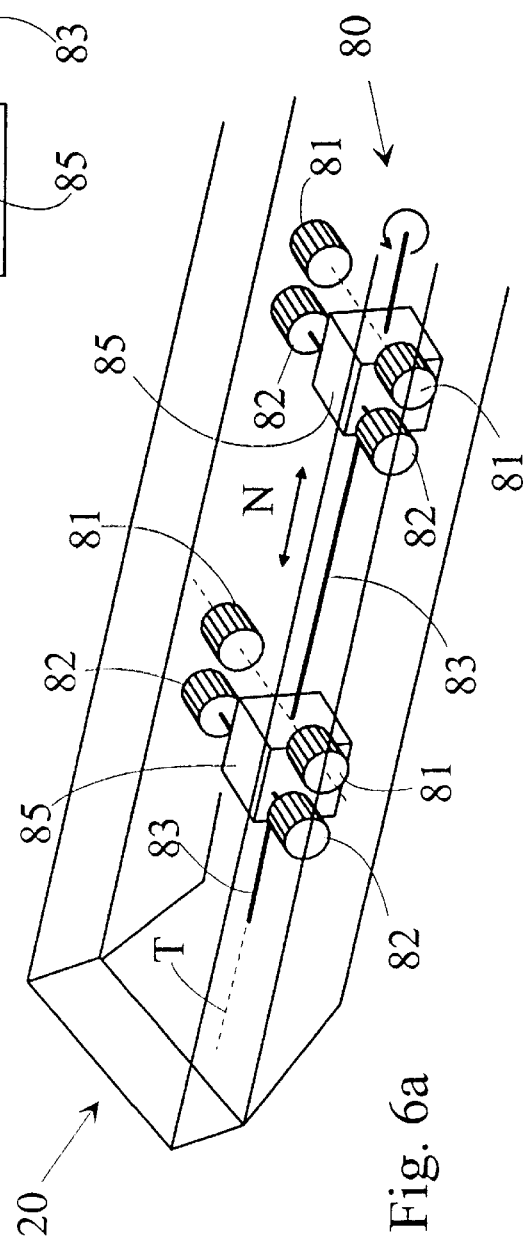
FIG. 6a shows schematically the principle of the driving transmission within the floating chassis, for the propulsion of the amphibious caravan.

FIGS. 6a–c illustrate different details of a possible embodiment of the driving mechanism of the caravan 10. In this embodiment the driving mechanism comprises a transmission 80 designed to transmit the power from the engine of the vehicle 1 to the caravan 10. The transmission 80 comprises roller pairs consisting of the rollers 81 and 82. The driven wheels 84 of the vehicle 1 are rolling on the roller pairs, and thereby rotate the rollers 81 and 82. The rotation of the roller pairs is transmitted to the driving axle 83 via the gear transmission 85. According to a further improvement of the invention, the transmission 80 is constructed within the chassis 20 in a manner so that it is movable along the longitudinal axis of the chassis 20. The transmission 80 may be moved at least to an extent to position the rollers 81 and 82 exactly under the driven wheels of 84 of the vehicle 1. E.g. as shown in FIG. 6a, the transmission 80 is glidable along a driving axle 83, which axle 83 is extending parallel with the longitudinal axis of the chassis 20. The center line of the axle 83 is indicated by the dotted line T. The transmission 80 may glide forward and backward along the axle 83, as indicated by the double arrow N, and the driving mechanical connection between the gear transmission 85 and the axle 83 is made in the proper position with a suitable clutch mechanism. FIG. 6a illustrates this by showing the transmission 80 in two different positions. In this manner the vehicle 1 may always board the floating chassis with its front towards the bow of the chassis 20, irrespective of the drive system of the vehicle 1, i.e. irrespective whether the vehicle 1 has a front-wheel drive or a rear-wheel drive. Further, the vehicle 1 may be placed completely at the front part of the deck 27, so there is still some useful space left on the deck 27, between the cabin 30 and the vehicle 1, under the canopy 32.

Otherwise the transmission 80 has a known structure, and comprises known mechanical, electrical, hydraulic or similar elements and parts. The power is also transmitted in a known manner from the driving axle 83 to the marine screw 41. Thereby the 20 chassis performs as a fully functional, self-propelling vessel.

Optionally, the non-driving rollers 81 of the transmission may be used to drive a fan to cool the engine of the vehicle 1, because the floating chassis 20 will obviously not move in the water fast enough to generate sufficient air flow for the cooling of the engine. Additionally, the rollers 81 may also operate a known pump used for removing the water from the chassis 20, which was collected due to accidental minor leaks or as a result of larger waves spilling over the side of the chassis 20.

Figure 7A:
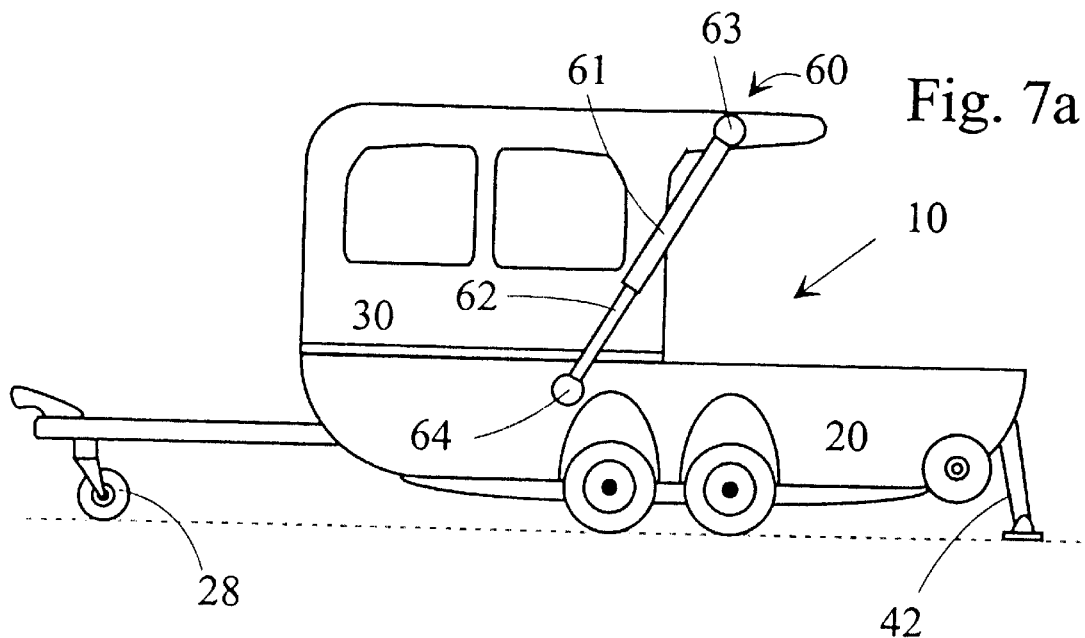
FIGS. 7a–b show another embodiment of the cabin-rail support system and the cylinder-piston pair for facilitating the movement of the cabin, in a side view similar to FIGS. 3a–b.
Figure 7B:
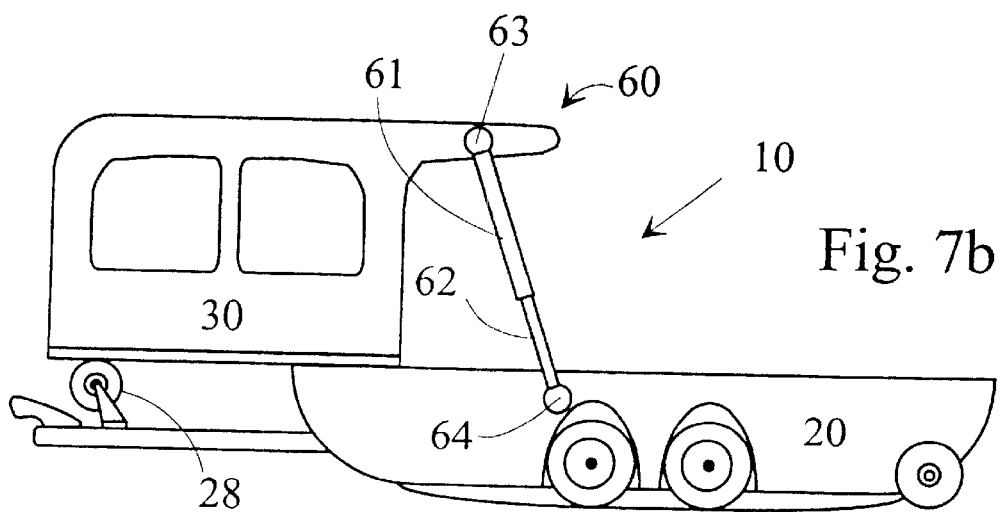

FIGS. 7a and 7b show a slightly modified version of the structural elements shown in FIGS. 3a and 3b. Here the cabin 30 is propped up by the upwards turned backing wheel 28. The pushing mechanism 60 has been placed more forward (towards the bow), and thereby better contributes to the stabilising of the cabin 30, without covering the windows of the cabin 30. Instead of the marine screw 41, the propulsion of the floating unit is effected by means of a water-jet propulsion system (not shown), hidden in the chassis 20.

With the caravan 10 according to the invention, not only the deck 27 will be enlarged by moving the cabin 30 backward, but as a further advantage, the potential displacement of the mass center caused by the vehicle 1 may be compensated completely. This is of special importance when the chassis 20 is afloat, because this measure effectively contributes to the increased safety of the whole floating unit. The mass center may be adjusted especially well, if the transmission 80 is also movable along the length of the chassis 20, because in this case the vehicle 1 may be positioned optimally on the deck 27.

Optionally, the displacement of the cabin 30 may be effected continuously and dynamically by a computer-controlled or other intelligent unit, which continuously analyses the momentary position and balance of the chassis 20, and also analyses its statistical behaviour.

Generally, the caravan according to the invention is a relatively light and short unit, which is easily towed on road, and is easily transported by an average passenger car. At the same time, when it is launched on water, the deck is significantly enlarged, and provides enough space to transport the towing vehicle. Therefore, this type of caravan guarantee full freedom of movement to the user. As a further advantage, the overall balance of the floating caravan will greatly improve, because the mass center is adjustable through the displacement of the cabin. In this way the chassis will be always in the optimal horizontal position on water.

It will be obvious for those skilled in the art that the caravan of the invention may be realised in other embodiments than those shown in the drawings. E.g. there is nothing in the way for providing an independent power source in the caravan, and in this case the transmission 80 may be omitted. Instead, the caravan may be steered from the cabin, and the marine screw and the rudder can be placed on the other end of the chassis. As an alternative embodiment, not one, but two cabins may be installed on the chassis. The two cabins may glide forward and aft, and leave a free deck area between them. Otherwise the deck could be completely covered by the two cabins when the caravan is towed on land. E.g. an 8 m long caravan could be equipped with two cabins, each 4 m long. Pushing these back 2 and 3 meters, a 5 meter long free deck is created between them.

What is claimed is:

1. Amphibious caravan, comprising:
   a floating chassis with wheels, said floating chassis having a towing mechanism for attaching said floating chassis to a vehicle,
   a vehicle deck receiving a towing vehicle, said vehicle deck being situated adjacent to one of at least one cabin, propulsion means suitable for movement on water, wherein movement of said one of at least one cabin balances the caravan on water, wherein at least one of said at least one cabin has a living compartment, said cabin having a living compartment being movable substantially parallel to the longitudinal axis of the chassis, so that the length of said deck receiving the vehicle is variable, and
   wherein said one of at least one cabin, said towing mechanism and said chassis constitute a single unit.

2. The caravan according to claim 1, further comprising a drive mechanism.

3. The caravan according to claim 2, wherein said drive mechanism comprises a transmission cooperating with the undercarriage of said towing vehicle.

4. The caravan according to claim 3, wherein said transmission cooperates with the wheels of said towing vehicle for utilising the power of the engine of said towing vehicle.

5. The caravan according to claim 2, wherein said drive mechanism is translatable along the longitudinal axis of said chassis, and thereby being adjustable to the size and drive type of said driving vehicle.

6. The caravan according to claim 5, wherein said cabin having a living compartment is guided along a rail system by a self-adjusting roller pair.

7. The caravan according to claim 1, wherein said deck comprises sideways extendible raves.

8. The caravan according to claim 1, comprising a hydraulic or spring-action cylinder-piston pair for facilitating the movement of said cabin.

9. The caravan according to claim 1, wherein said wheels of said chassis are at least partly retractable into said chassis.

10. The caravan according to claim 1, further comprising a retractable and extendible support wheel for facilitating the landing and/or launching of the caravan.

11. The caravan according to claim 1, further comprising at least one of a foldable and extendible support leg for stabilising the caravan on land.

12. The caravan according to claim 1, further comprising a driving engine in said chassis.

13. The caravan according to claim 1, wherein said chassis comprises a towing mechanism extending from said chassis, and said cabin being movable along a rail system bearing on said towing mechanism.

* * * * *